Sept. 25, 1951  S. C. HOARE ET AL  2,569,311
TEMPERATURE COMPENSATED VISCOUS DAMPER
Filed March 26, 1948

Inventors:
Stephen C. Hoare,
Almon J. Corson,
by *Harell S. Mack*
Their Attorney.

Patented Sept. 25, 1951

2,569,311

UNITED STATES PATENT OFFICE 2,569,311

TEMPERATURE COMPENSATED VISCOUS DAMPER

Stephen C. Hoare, Manchester, and Almon J. Corson, Marblehead, Mass., assignors to General Electric Company, a corporation of New York Application March 26, 1948, Serial No. 17,218

8 Claims. (Cl. 73—430)

Our invention relates to viscous dampers for rotary devices such, for example, as small deflection type measuring instruments, and its object is to provide a simple, inexpensive damper requiring little space and which is so compensated as to minimize the effects of temperature changes on damping, due to differences in the viscosity at different temperatures of the damping liquid used.

Figure 1:
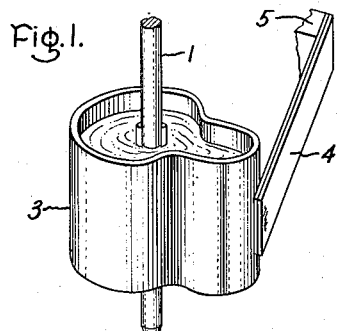
Figure 1A:
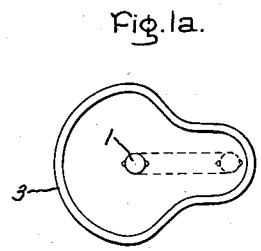
Figure 2:
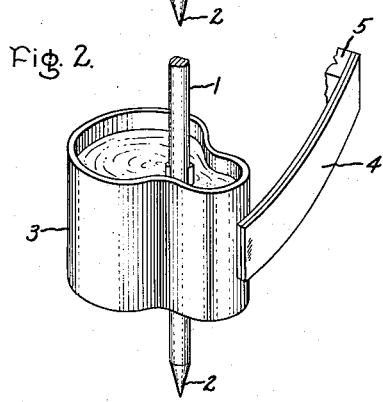
Figure 3:
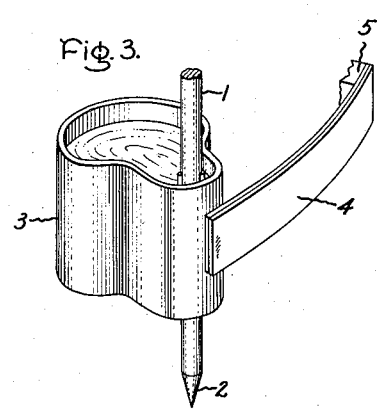
Figure 8:
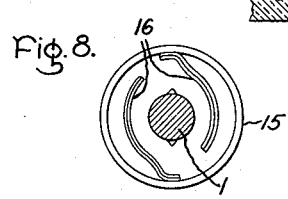

The features of our invention which are believed to be novel and patentable will be pointed out in the claims appended hereto. For a better understanding of our invention, reference is made in the following description to the accompanying drawing, in which Figs. 1, 2, and 3 represent perspective side views of a preferred form of temperature compensated viscous damper as applied to a measuring instrument, showing differences in the relative position of damper parts at different temperatures. Fig. 1a may be considered as a plan view of the damper of Fig. 1. Figs. 4, 5, 6, and 7 represent cross-sectional views of various modified forms of temperature compensated viscous dampers embodying our invention; and Fig. 8 is a plan view of Fig. 7.

Referring now to Figs. 1, 2, and 3, I may represent the lower end of the shaft of a deflection type measuring instrument such, for example, as a voltmeter, and 2 its lower jewel bearing pivot. In instruments of this type when there is a change in measurement, the armature shaft turns toward the new measurement position and unless this motion is damped, the shaft will usually turn beyond the measurement position or "overshoot" as it is called, and will then oscillate back and forth through the correct measurement position a few times with decreasing amplitude before coming to rest at the correct measurement position. This, of course, makes the instrument difficult to read quickly; and to reduce such oscillations and enable the instrument to be read quickly and correctly under varying measurement conditions, the moving system is generally damped. The amount of damping required for satisfactory results depends upon the torque of the instrument, the inertia of the moving system, and the severity of the measurement variations expected. Our invention relates to a viscous damper for this purpose having novel features, which is low in cost, takes up little room, and is effective for the purpose for which designed at various temperatures.

Spaced from and surrounding the shaft I is a small cylindrical sleeve 3 not necessarily circular in cross section and open at both ends, and supported in position on the free end of a bimetallic temperature responsive strip 4, having its other end secured at 5 to some fixed part of the instrument. In this sleeve and between it and the shaft I is placed a small amount of a viscous damping liquid. In this form of the invention, the dimensions of the parts are such that the liquid will be retained in the sleeve 3 between it and shaft I by capillary action. Thus, a typical set of dimensions for a small voltmeter will be to use a shaft 0.04 inch in diameter, and a sleeve 3 having an average inside diameter of 0.115 inch. The length of the sleeve and amount of liquid therein will depend somewhat upon the amount of damping required and the viscosity of the liquid use, but for a small sensitive voltmeter the sleeve 3 may be ¼ inch long and contain a small drop of a suitable damping liquid. It is desirable to use a liquid which will not rust or corrode parts, does not evaporate easily, and has the desired viscosity, and, if possible, a liquid the viscosity of which does not change with temperature. Most oils which suggest themselves for the damping liquid decrease in viscosity with a rise in temperature to such an extent that if the correct amount of damping is obtained, say at zero degrees C., there will be insufficient damping at 25 degrees C. Likewise, if adjusted for correct damping at 25 degrees C., there will be altogether too much damping at zero degrees C., and this variation of viscosity with temperature has heretofore discouraged the practical use of liquid damping arrangements for many applications. Where possible, we prefer to use silicone oil for the main portion of the damping liquid employed, because this oil has a relatively low temperature coefficient of viscosity. Oils of this character are described in United States Patents Nos. 2,389,802 to 2,389,807, inclusive, November 27, 1945. In addition, we also provide temperature compensation of such character as to obtain substantially constant damping at all operating temperatures regardless of changes in viscosity of the damping liquid with changes in temperature.

In Figs. 1 to 3, this temperature compensation is obtained by movement of the sleeve 3 away from approximately the most nearly concentric position with respect to shaft I as the temperature increases, by means of the thermal responsive bimetallic strip 4, and vice versa.

Assuming it is desired to compensate the damper over a temperature range from 10 to 50 degrees C., the damper will be designed to provide the correct amount of damping when its sleeve 3 is approximately centered about the shaft 1 at the lowest temperature of 10 degrees as indicated in Fig. 1. Then at 25 degrees C. and 50 degrees C., the sleeve will have been moved by the strip 4 to approximately the positions represented in Figs. 2 and 3, respectively. For a given viscosity of the liquid in the sleeve, the least damping is obtained when the sleeve 3 is most nearly concentric with the shaft 1 as in Fig. 1. However, as the temperature rises, the viscosity of the liquid decreases and if the conditions otherwise remain as in Fig. 1, the damping will decrease. However, by increasing the eccentricity, as described above, as the temperature increases and the viscosity decreases, the amount of damping can be caused to remain substantially constant because when the shaft and sleeve are closer together, the film of liquid in contact with the shaft does not move as easily when the shaft turns; and the surface tension, capillary action, damping surface area or turbulence forces, or some combination thereof, is changed in such a way as to increase the damping for a given viscosity or to maintain the damping constant with a decrease in viscosity. It is to be noted that the liquid only partially fills and hence does not overflow the capillary space available, and hence, both capillary action and surface tension are present.

The above is not necessarily an entirely complete or accurate explanation of why the damping increases. The fact remains that by altering the geometry of that capillary space which is occupied by the damping liquid, a change in damping not due to a change in viscosity occurs and can be made equal and opposite to the change in damping which is due to viscosity with changes in temperature. Actually, when this compensation is perfect, there is no resultant change in damping, but the damping factors due to viscosity changes and due to the change in the geometry of the capillary space do change, and for want of better names, we refer to these as the viscosity damping factor and the capillary space damping factor. Thus, by a proper selection of damping liquid, shape of sleeve and character of movement of the sleeve by the bimetal strip, the damping may be maintained substantially constant at the desired value over the temperature range at which the instrument is to be operated in practice.

We have found that a small voltmeter may be provided with the proper amount of temperature compensated liquid damping in the manner described above. Thus, we took a typical small voltmeter having a 90-degree range of deflection which had a full scale torque of 0.33 mmg. By this we mean that if energized for full scale deflection but held at the zero end of the scale, the upscale torque will be 0.33 mmg. The inertia of its armature assembly was 0.18 g. (cm.)². We used the damper of Fig. 1, using silicone oil of grade No. 9996 having a viscosity of 26,000 centistokes. At 10 degrees C. and with the shaft and sleeve approximately concentric as shown in Fig. 1, the damping was satisfactory and corresponded to approximately one per cent "overshoot." Without the temperature compensation the "overshoot" was 30 per cent at 55 degrees C., due to a decrease in the viscosity of the liquid. By means of the temperature compensator which moved the sleeve from approximately the position of Fig. 1 to that represented in Fig. 3 as the temperature increased from 10 to 55 degrees C., we were able to reduce the "overshoot" at 55 degrees C. to the same order of magnitude or even less than it was at 10 degrees C.

With a perfectly cylindrical sleeve and a substantially radial movement of the sleeve relative to the shaft at a rate which is linear with change in temperature, the compensation although present tends to be insufficient at intermediate temperatures. This is corrected by the use of a bimetal actuator which has the required temperature motion characteristic, or by shaping the walls of the sleeve, or both. Thus, the sleeve may have a somewhat elongated cross-sectional shape such as represented in Fig. 1a and may have a movement relative to the shaft as indicated by the full and dotted line positions of the shaft, corresponding to low and high temperature limits of the device. This shape causes the nearest wall of the cup to approach the shaft at a faster rate with a given rise in temperature over the lower half of the temperature range than if the cup were perfectly circular and hence increases the damping over such range. It is easy to shape the sleeve by bending as required to provide perfect compensation over the entire temperature range, if not satisfactory when first assembled. Other initial adjustments that may be used for more perfectly adapting a given damping device for a given instrument requirements are; varying the amount of liquid used, adjusting its viscosity by mixing with another liquid of a different viscosity, adjusting the initial cold temperature position of the sleeve relative to the shaft, etc. The damper may be applied to the shaft at any convenient position and, likewise, the shaft may be horizontal or vertical since the capillary dimensions retain the liquid in the sleeve by capillary attraction.

With a perfectly round shaft 1, the rotation of the instrument shaft does not change the geometry of the capillary space and hence such shape and resultant damping would be independent of the rotary position of the shaft.

In Fig. 1a, we have represented an instrument shaft 1 which is not perfectly round where it passes through the damper. In this case, we have shown a pair of small vanes protruding from opposite sides of the shaft giving the shaft a somewhat elongated cross section. This feature may be present where it is desirable for any reason to obtain a greater damping at some particular part or parts of the instrument scale than at others. For instance, assume we have an instrument with a 90-degree scale and that we want damping at all points of the scale, but we wish to have particularly heavy damping at the upper end of the scale to protect the instrument pointer from banging too hard against the stop at the upper end of the scale when the instrument is subject to overloads. In such a case, the rotary position of the shaft relative to the cup would be that represented in Fig. 1a at zero deflection. For a 90-degree up scale deflection, the vanes would be turned at right angles to the position shown and the average damping shaft area would therefore approach more closely to the inside surface of the cup 3 at all temperatures and therefore would increase the damping at the upper end of the scale. It is thus seen that in Fig. 1 the radial distances of both damping surfaces from the axis of rotation of shaft 1 vary about the axis of rotation.

Figure 4:
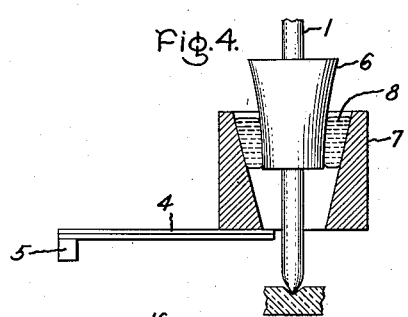

Fig. 4 represents a modified form of temperature compensated viscous liquid damper adapted for a somewhat higher order of damping as compared to the first modification described. On shaft 1 is a damper part 6 of approximately truncated cone shape, and surrounding and spaced therefrom by a capillary space is a cylindrical sleeve member 7 having a truncated cone-shaped inner surface. Between these two parts is a small quantity of a suitable viscous liquid 8. The sleeve 7 is supported for approximately axial movement in response to temperature changes by a bimetal thermal responsive strip 4 supported at 5. As the temperature increases, the sleeve 7 is raised to change the geometry of the capillary space by reducing the spacing between it and part 6, and thereby compensating for the increase in viscosity of the liquid 8 and so maintains the damping constant.

Figure 5:
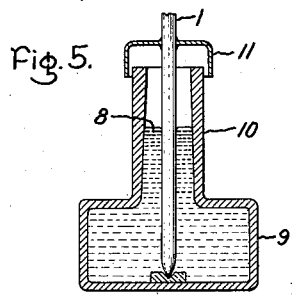

Fig. 5 shows another modification where the increase in volume of the damping liquid with rise in temperature is used to compensate for an increase in viscosity. Here the shaft 1 is inserted in a small circular tank having a lower storage part 9 and a smaller upper expansion chamber part 10 closely spaced about the shaft. The tank is open to the air at the top, but this as well as the other modifications may be provided with a dust cover 11 secured to the shaft 1. It is evident that the amount of damping for a given viscosity will be proportional to the height of the liquid 8 in the capillary space along the shaft in the small diameter expansion chamber part 10 where the walls are close to the shaft. With a rise in temperature the volume of liquid increases and rises in chamber 10 and the viscosity decreases. Thus the geometry of the space occupied by the damping liquid is changed in response to the temperature responsive means or to the expansion of the liquid in tank part 9. The relative size and shape of the tank parts are chosen in relation to the temperature coefficients of expansion and viscosity of the liquid used to maintain the damping constant at the desired value over the temperature range encountered in use. The liquid used here also serves to lubricate the bearing at 2. The diameter of the overflow capillary chamber 10 is not necessarily constant at all levels.

Figure 6:
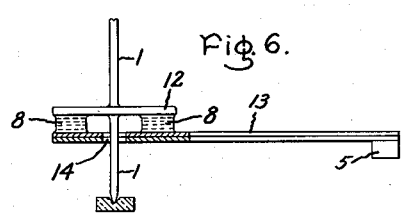

Fig. 6 shows another modification where a capillary space containing damping liquid 8 is provided between two flat surfaces, one surface on a disk 12 secured to shaft 1 and the other surface on the upper side of the free end of a bimetallic thermal responsive strip 13 fixed at 5. The strip 13 has an opening at 14 for the shaft 1. As the temperature increases and the viscosity of the liquid decreases, the strip 13 rises and decreases the spacing between it and disk 12. This also increases the contact area surface of the liquid with the spaced parts. Thus, the damping factors which depend on spacing and area are increased as the viscosity damping factor is decreased to maintain the resultant damping approximately constant. The parts are proportioned to provide the desired amount of damping and compensation. A strip 13 with a relatively small movement for a given change in temperature will be used here.

Figure 7:
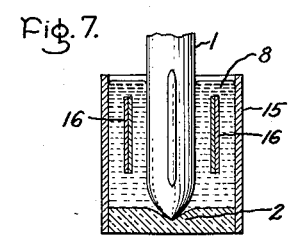

Figs. 7 and 8 show section and plan views of a still further use of the general principles embodied in our invention. The shaft 1 is inserted in a cup 15 containing a damping liquid 8. The bottom of the cup may be closed by the bearing jewel 2. Secured to opposite inside walls of the cup are two bimetal strips 16 curved part way about and on opposite sides of the shaft within the liquid. Upon an increase in temperature these strips will bend towards the shaft to increase the damping by an amount which it is decreased due to a decrease in liquid viscosity. As in the other modifications the parts will be proportioned and a damping liquid used which will accomplish the results desired. Thus increasing the axial dimensions of the cup and strips 16 will increase the damping. The initial cold spacing between the strip 16 and shaft 1 may be easily varied. The strips 16 may be tapered or not as the requirements demand. Only one strip may be used, or the two strips may have different temperature bending characteristics, etc.

While a silicone damping liquid has been mentioned and is particularly suitable as it has a relatively low temperature coefficient of viscosity and does not require so much temperature compensation, damping liquids which may be more suitable in other respects for some applications may also be used because the amount of temperature compensation available may be changed over a considerable range as required.

What we claim as new and desire to secure by Letters Patent of the United States is:

1. A viscous liquid damper for damping the movement of a rotary part, comprising in combination with such rotary part a relatively stationary part adjacent said rotary part and separated therefrom by a capillary space, a damping liquid having a temperature coefficient of viscosity contained within said space solely by capillary action for the purpose of damping the rotary member when rotated, and bimetallic temperature responsive means for supporting said relatively stationary part and for moving the same relative to the rotary part so as to decrease the minimum spacing between said parts as the temperature increases which to compensate for the decrease in damping which would otherwise occur due to the change in viscosity of said liquid.

2. A viscous liquid damper for damping the rotary movement of a shaft, comprising in combination with such a shaft a relatively stationary sleeve surrounding said shaft and separated therefrom by a capillary space, a viscous damping liquid having a temperature coefficient of viscosity contained within said space by capillary action for producing damping on the shaft when turned, and a bimetallic temperature responsive strip for supporting said sleeve and for moving the same in a lateral direction relative to the shaft in response to temperature changes such that the minimum spacing between the sleeve and shaft is reduced with a rise in temperature, said sleeve having its interior surface so shaped in relation to its temperature responsive movement relative to the shaft that the damping is substantially independent of temperature within the intended temperature operating range.

3. A viscous liquid damper for damping the rotary movement of a shaft, comprising in combination with such a shaft a relatively stationary sleeve surrounding said shaft and separated therefrom by a capillary space, a viscous damping liquid having a temperature coefficient of viscosity contained within said capillary space for producing damping on the shaft when the latter is rotated, and a bimetallic temperature responsive strip for supporting said sleeve and for moving the same relative to the shaft in response to temperature changes, such movement changing the geometry of such capillary space in a manner to increase the damping as the temperature increases for the purpose of compensating for the decrease in damping with rise in temperature that would otherwise occur due to the change in viscosity of said liquid, said sleeve also having its interior surface so shaped in relation to its temperature responsive movement relative to the shaft that the damping remains substantially constant over the intended temperature operating range for a given rate and range of rotary movement of the shaft.

4. A viscous liquid damper for damping the rotary movement of a rotary member which has a range of rotary movement less than a complete revolution, comprising in combination with such a rotary member, a relatively stationary member surrounding and separated from the rotary member by a capillary space, a viscous damping liquid contained in and only partially filling said space between the members for producing damping on the rotary member when the latter is rotated, temperature responsive means for moving the relatively stationary member to decrease the minimum spacing between said members upon an increase in temperature, the radial distances from the axis of rotation of said rotary member to its surface and to the adjacent surface of the relatively stationary member varying about said axis of rotation so that the minimum spacing between them is also changed by reason of the rotation of said rotary member such that the damping of said rotary member is different at different parts of its range of rotation.

5. A viscous liquid damper for rotary members, comprising in combination with such a rotary member, a relatively stationary member separated from the rotary member by a capillary space, a viscous liquid contained within said space but only partially filling said space for producing damping on the rotary member when the latter is rotated, and temperature responsive means associated with said relatively stationary member for moving the same in a direction to reduce the minimum spacing between said members thereby changing the geometry of said capillary space occupied by said liquid in a manner that would increase the damping with rise in temperature assuming a constant liquid viscosity, for the purpose of compensating for the decrease in damping that would otherwise occur due to the decrease in the viscosity of the damping liquid with such rise in temperature.

6. A viscous liquid damper for a rotary shaft, comprising in combination with such a shaft having a range of rotation of the order of 90 degrees, a sleeve surrounding said shaft and separated therefrom by a capillary space, a viscous damping liquid contained in said space, a bimetallic strip for supporting said sleeve and for moving it laterally relative to the shaft in response to changes in temperature, said sleeve having a somewhat elongated cross section in the direction of such lateral movement and is positioned so that the shaft is near the center of the sleeve at the minimum temperature range of intended operation, said shaft also having a somewhat elongated cross section in the direction of the lateral movement of the sleeve when the shaft is near one end of its range of rotary movement whereby the minimum spacing between shaft and sleeve is decreased both by a rise in temperature and by rotation of said shaft from said one end of its range of rotation.

7. A viscous liquid damper for rotary apparatus, comprising in combination with a rotary part to be damped a relatively stationary part positioned closely adjacent to the rotary part and separated therefrom by a capillary space, a damping liquid having a temperature coefficient of viscosity contained within said space solely by capillary action for the purpose of damping the rotary part, said parts being shaped such that the capillary spacing is varied by movement of the relatively stationary part in a direction parallel to the axis of rotation of the rotary part, and a bimetallic member for supporting the relatively stationary part and for moving it parallel to the axis of rotation of the rotary part in the direction to reduce the minimum capillary spacing upon an increase in temperature.

8. A damper for measuring instruments comprising in combination with a rotary part of the instrument, a relatively stationary member positioned closely adjacent to the rotary part such that a capillary space is provided between said adjacent surfaces of the radial distances from the axis of rotation of said rotary part to its surface and to the adjacent surface of the relatively stationary member varying about said axis of rotation so that the geometrical dimensions of such space are dependent on the rotary position of the instrument part, a viscous damping liquid contained in and only partially filling such space, and temperature responsive means subject to the same temperature as said liquid for changing the geometry of the capillary space occupied by the damping liquid as the temperature changes to compensate for changes in instrument damping which would otherwise occur due to changes in the viscosity of said liquid.

STEPHEN C. HOARE.
ALMON J. CORSON.

REFERENCES CITED

The following references are of record in the file of this patent:

UNITED STATES PATENTS

| Number | Name | Date |
|---|---|---|
| 1,119,013 | Hapgood | Dec. 1, 1914 |
| 1,407,302 | Bouche | Feb. 21, 1922 |
| 1,951,578 | Peters | Mar. 20, 1934 |
| 2,084,561 | Prescott et al. | June 22, 1937 |
| 2,180,893 | Best | Nov. 21, 1939 |
| 2,313,758 | Matthews | Mar. 16, 1943 |
| 2,417,282 | Wheeler | Mar. 11, 1947 |

FOREIGN PATENTS

| Number | Country | Date |
|---|---|---|
| 472,991 | Great Britain | Oct. 4, 1937 |
| 684,281 | Germany | Nov. 2, 1939 |